US012718645B1

(12) United States Patent
Rutherford

(10) Patent No.: US 12,718,645 B1
(45) Date of Patent: Aug. 25, 2026

(54) STEPPER RE-BUNCHER FOR STACKING MEDIA ITEMS

(71) Applicant: Cardtronics USA, Inc., Atlanta, GA (US)

(72) Inventor: Craig Rutherford, Blairgowrie (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/245,598

(22) Filed: Jun. 23, 2025

(51) Int. Cl.
*G07D 11/16* (2019.01)
*B65H 5/02* (2006.01)
*B65H 7/02* (2006.01)

(52) U.S. Cl.
CPC ............. *G07D 11/16* (2019.01); *B65H 5/021* (2013.01); *B65H 5/023* (2013.01); *B65H 7/02* (2013.01); *B65H 2301/42132* (2013.01); *B65H 2701/1912* (2013.01); *G07D 2211/00* (2013.01)

(58) Field of Classification Search
CPC ................ B65H 2404/64; B65H 31/06; B65H 2701/1912; B65H 29/46; B65H 2301/4213; B65H 3/54; B65H 5/023; B65H 5/021; B65H 2301/42132; G07D 11/16
See application file for complete search history.

(56) References Cited

U.S. PATENT DOCUMENTS 11,989,994 B2 * 5/2024 Woo ........................ B65H 3/047
12,180,027 B2 * 12/2024 Wallman-Carlsson ...................... G07D 11/14
2011/0133389 A1 * 6/2011 Nemoto ................. B65H 29/34 271/220

* cited by examiner

*Primary Examiner* — Jeremy R Severson
(74) *Attorney, Agent, or Firm* — Schwegman Lundberg & Woessner, P.A.

(57) ABSTRACT

A stepper re-buncher for stacking media items within a transaction terminal includes first and second sliding metal plates driven by a single motor in a synchronized stepping motion. The first plate includes a window aperture allowing media items to pass through, while both plates operate to securely grip and stack multiple media items in sequence. The stepper re-buncher achieves reduced spatial requirements through elimination of circular/oval designs by maintaining stacked media items in a stationary position during stacking operations.

20 Claims, 11 Drawing Sheets

STEPPER RE-BUNCHER FOR STACKING MEDIA ITEMS

BACKGROUND

Traditional re-buncher devices used in transaction terminals, such as automated teller machines (ATMs), employ either circular or oval designs with dimensions large enough to accommodate the longest media items, typically 225 mm for checks. These conventional designs present significant space constraints within the terminal layout due to their large footprint requirements. The circular or oval configurations require media items to travel in a circuit each time an item is stacked, resulting in designs with circumferences greater than 225 mm. This creates challenges for positioning the re-buncher within the device layout and impacts the overall efficiency of media handling operations.

DETAILED DESCRIPTION

Figure 1:
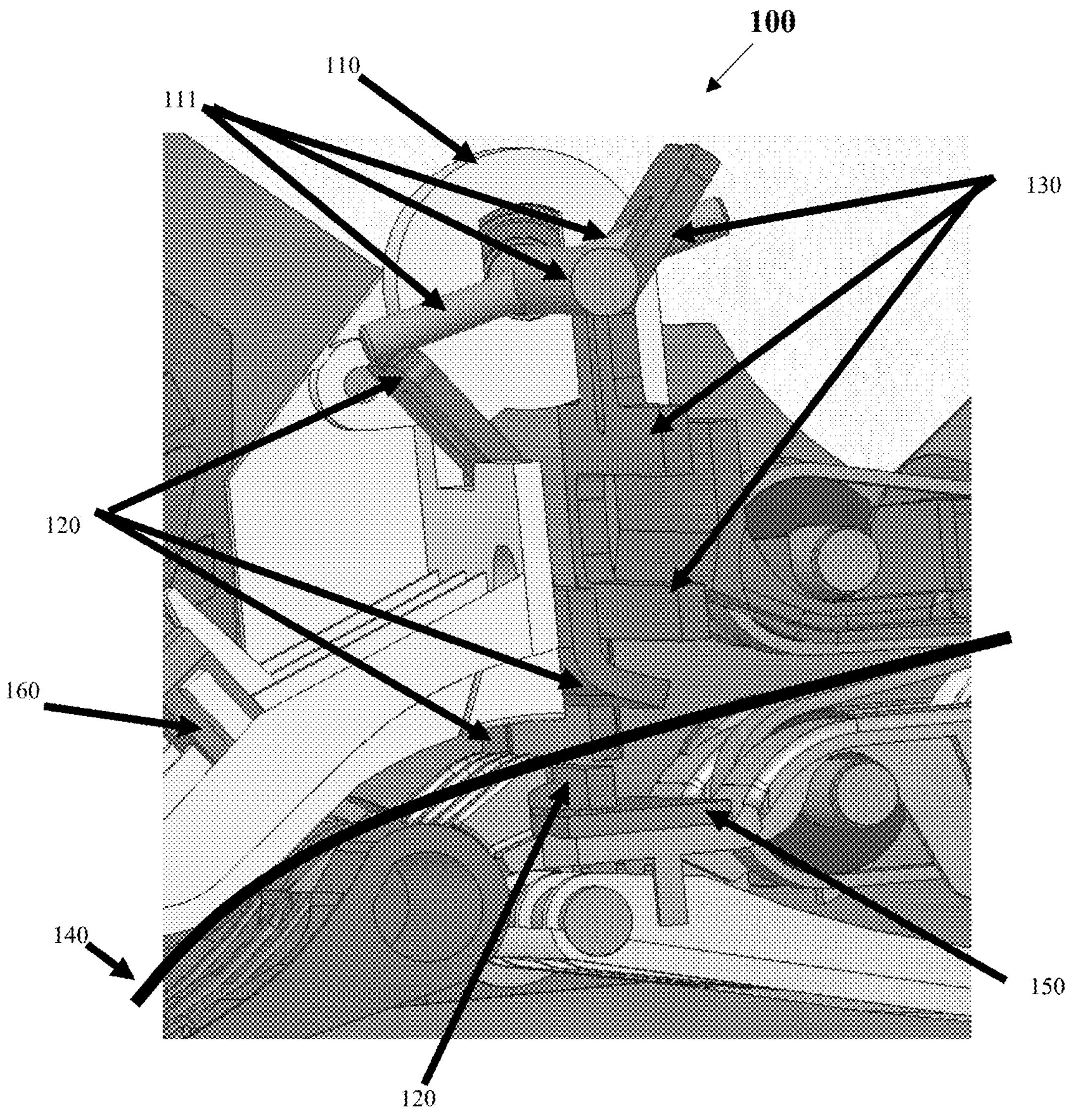
FIG. 1 is a diagram of a cross-sectional view of a stepper re-buncher apparatus, according to an example embodiment.

Media handling within transaction terminals requires efficient mechanisms for processing and stacking various media items, particularly checks and similar documents. Traditional re-buncher designs have relied on circular or oval configurations that require substantial space within the terminal layout. These conventional designs typically need dimensions sufficient to accommodate media items up to 225 mm in length, resulting in re-bunchers with large circumferences exceeding 225 mm. The positioning constraints of such designs often force awkward placement within the device, as evidenced in existing implementations where re-bunchers must be positioned at angles under other components. Current circular/oval re-bunchers require media items to continuously cycle through a circuit during stacking operations, leading to increased space requirements and reduced flexibility in terminal design.

The fundamental technical challenge lies in developing a media stacking mechanism that can efficiently handle multiple media items while significantly reducing the spatial footprint required within transaction terminals. Current re-buncher designs with their circular/oval configurations and large circumferences create restrictive layout constraints and inefficient use of space, limiting options for terminal design and potentially impacting overall device performance.

The disclosed technology utilizes a novel stepping motion mechanism with dual metal sliding plates operating in synchronized movement to achieve media stacking within a compact linear space. By eliminating the need for media items to cycle continuously during stacking operations, the technology enables a slim profile design that can be integrated within standard transport areas while maintaining secure control of media items throughout the stacking process.

In an embodiment, the stepper re-buncher employs two metal sliding plates driven by a single motor through a synchronized stepping motion. The first plate incorporates a window aperture allowing media items to pass through, while small teeth on the plate provide secure gripping pressure of approximately 0.043 $N/mm^2$ against a rubber grip plate.

In an embodiment, the stepping motion is achieved through a space-saving mechanism that converts rotational movement into linear motion using a planetary gearbox and gear train configuration. This provides the necessary low speed/high torque output for precise control of the sliding plates.

In an embodiment, the system utilizes a track sensor positioned just before the re-buncher to control precise positioning of media items, stopping them when their trailing edge is positioned a few millimeters from passing completely through the window aperture.

In an embodiment, the re-buncher transport belt system is carefully calibrated to provide optimal grip force for handling both single items and stacks of up to 10 items, while allowing the metal plate clamping mechanism to maintain positive control during stacking operations.

In an embodiment, the stepper re-buncher achieves a significant reduction in spatial requirements compared to conventional circular or oval re-buncher designs. The disclosed technology requires approximately 9,715 $mm^2$ of plan area, representing a substantial decrease from the 13,782 $mm^2$ required by traditional SCPM1 re-bunchers. This space reduction is achieved through the elimination of the circular or oval configuration that necessitates dimensions large enough to accommodate the longest media items, typically requiring circumferences greater than 225 mm.

In an embodiment, the slim profile design of the stepper re-buncher enables positioning within standard size areas of straight transport, providing greater flexibility in device layout compared to conventional designs. Traditional re-bunchers create restrictive positioning constraints, often requiring awkward placement at angles under other components within the device layout. The disclosed technology's rectangular footprint allows for more efficient utilization of available space within transaction terminals.

In an embodiment, the stepper re-buncher eliminates the need for media items to continuously cycle around a circuit during stacking operations, as required by conventional circular or oval designs. Instead, the stacked bunch of media items remains stationary while incoming items are placed on top, reducing mechanical complexity and improving operational reliability. The synchronized stepping motion of the dual metal plates provides precise control over media positioning and stacking operations.

In an embodiment, the disclosed technology utilizes a single motor to drive both sliding plates through a space-saving mechanism that converts rotational movement into linear motion. This design approach reduces the number of drive components compared to traditional systems while maintaining precise control over the stacking process. The planetary gearbox and gear train configuration provides the necessary low speed and high torque output for reliable operation.

In an embodiment, the stepper re-buncher incorporates specific control mechanisms, including track sensors for precise media positioning and calibrated grip pressure of approximately 0.043 $N/mm^2$ through small teeth on the metal plates. The transport belt system is engineered to provide optimal grip force for handling both single items and stacks of up to 10 items while allowing the metal plate clamping mechanism to maintain positive control during stacking operations.

In an embodiment, the stepper re-buncher utilizes a stepper motor rather than a DC motor for the drive system, allowing for control without requiring rotational position sensors. The motor is driven slightly longer than required in both directions, with the metal plates powered until a hard stop is reached and the motor stalls out. This method resets the position of the system during each operation, counteracting any motor slippage that may occur.

The following detailed description of the stepper re-buncher will be better understood with reference to the accompanying drawings, which illustrate various embodiments and operational stages of the disclosed technology. The figures demonstrate the structural components, spatial relationships, and sequential operation of the stepper re-buncher mechanism, providing visual context for understanding how the synchronized stepping motion of the dual metal plates achieves efficient media stacking within the reduced footprint design. These illustrations show both the overall assembly and the step-by-step operational sequence that enables the stepper re-buncher to stack multiple media items while maintaining the compact profile that distinguishes it from conventional circular or oval re-buncher configurations.

FIG. 1 is a diagram of a cross-sectional view of a stepper re-buncher apparatus 100, according to an example embodiment. Notably, the components are shown schematically in simplified form, with only those components relevant to understanding of the embodiments being illustrated.

Furthermore, the various components (that are identified in stepper re-buncher apparatus 100) are illustrated and the arrangement of the components are presented for purposes of illustration only. Notably, other arrangements with more or less components are possible without departing from the teachings of a stepper re-buncher apparatus that utilizes vertically oriented stacking plates, presented herein and below.

The stepper re-buncher apparatus 100 includes a drive mechanism 110, pegs 111 or cylinders, a first sliding plate 120, a second sliding plate 130, a media path 140 or transport path, a rubber grip plate 150, and a track sensor 160. The drive mechanism 110 includes a single motor that transforms circular motion into synchronized linear motion for the first sliding plate 120 and the second sliding plate 130.

The pegs 111 include a crank mechanism with interconnected components. A first component rotates in a circular motion driven by the drive mechanism 110, while a second component extends through apertures in both sliding plates. As the first component rotates, the second component causes the first sliding plate 120 and the second sliding plate 130 to move in synchronized opposing vertical motion.

The second component of pegs 111 extends through peg aperture 122 in the first sliding plate 120 and peg aperture 132 in the second sliding plate 130, permitting the rotational movement to create synchronized upward and downward linear motion in the first sliding plate 120 and the second sliding plate 130. This configuration enables the single motor associated with drive mechanism 110 to control the synchronized movement of both sliding plates through the mechanical linkage provided by pegs 111.

The media path 140 defines the route through which media items travel during processing through the stepper re-buncher apparatus 100. As illustrated in FIG. 1, media items, such as checks, enter the stepper re-buncher apparatus from the left side of the media path 140 and exit the stepper re-buncher apparatus 100 from the right side of the media path. Positioned below the sliding plates is the rubber grip plate 150, which serves as the stationary gripping surface against which media items are secured during the media item stacking process of the stepper re-buncher apparatus 100.

Figure 2:
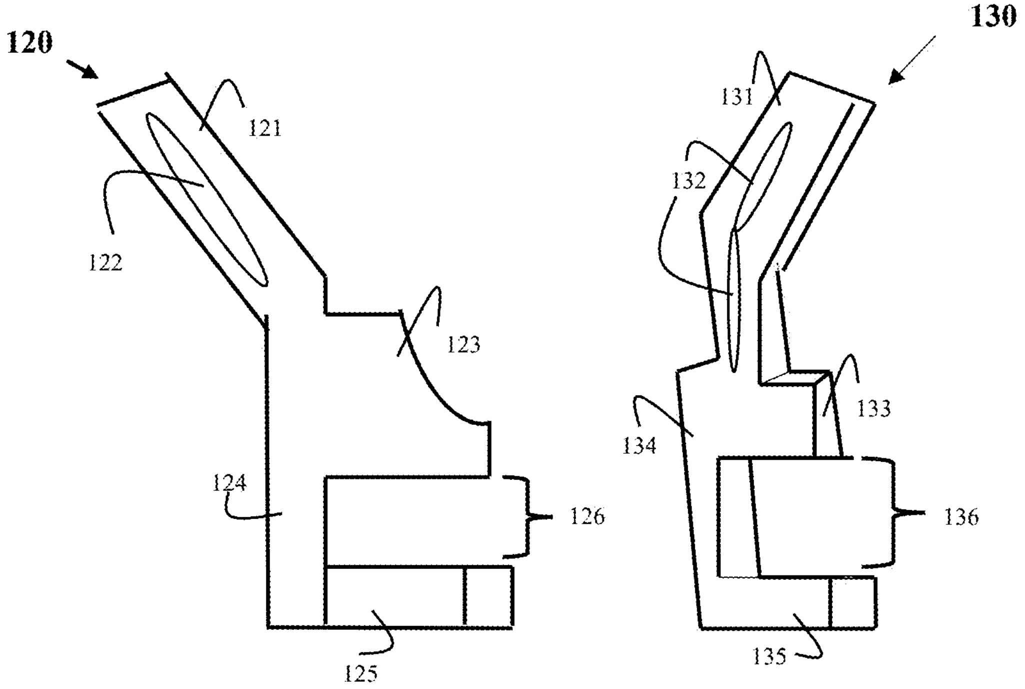
FIG. 2 is a diagram of two sliding plates for the stepper re-buncher apparatus, according to an example embodiment.

FIG. 2 is a diagram of two sliding plates (120, 130) for the stepper re-buncher apparatus, according to an example embodiment. FIG. 2 provides a detailed view of both sliding plates, illustrating their distinct structural features and functional elements. The first sliding plate 120 includes a first vertical member 121 containing the peg aperture 122 through which a portion of the second peg extends. A second extending top portion 123 is positioned above the window aperture 126, while the side 124 defines the boundary of window aperture 126. The base 125 of the first sliding plate 120 is configured to press against rubber grip plate 150 when the plate is in its lowered position.

The track sensor 160 is positioned along the media path 140 just before the stepper re-buncher apparatus 100 to detect the position of incoming media items. The track sensor 160 communicates with a controller to precisely control when transport belts stop, ensuring that the trailing edge of a media item is positioned a few millimeters from passing completely through window aperture 126.

The second sliding plate 130 features a similar but distinct configuration with a first vertical member 131 having peg aperture 132 for receiving a portion of the second component of pegs 111. The top of window aperture includes a horizontal extending member 133 that spans across an optional window aperture 136. The side 134 defines the boundary of the optional window aperture 136, which is included primarily for weight reduction rather than functional necessity. The base 135 of the second sliding plate 130 also presses against rubber grip plate 150 when in the lowered position.

The first sliding plate 120 includes gripping teeth on its base 125 that exert approximately 0.043 $N/mm^2$ of pressure against media items when pressed against rubber grip plate 150. These gripping teeth are essential for maintaining secure control of media items during the stacking process, particularly when transport belts attempt to pull media items through the apparatus.

The synchronized opposing motion of the sliding plates enables the stepper re-buncher apparatus 100 to stack up to ten media items without requiring the media items to continuously cycle through a circuit, as required by conventional circular or oval re-buncher designs. This stationary stacking approach contributes significantly to the reduced spatial footprint of approximately 9,715 $mm^2$ compared to traditional designs requiring 13,782 $mm^2$.

The window aperture 126 in first sliding plate 120 is essential for media item passage along the media path 140, allowing media items to pass through toward the second sliding plate 130 and the exit of the stepper re-buncher apparatus 100. The optional window aperture 136 in second sliding plate 130 demonstrates the design flexibility for weight optimization without compromising functionality.

The operational sequence of the stepper re-buncher apparatus 100 is best understood through examination of the six distinct stages that demonstrate how media items are processed and stacked using the synchronized stepping motion of the sliding plates. FIGS. 3 through 8 illustrate this sequential operation, showing how the first sliding plate 120 and second sliding plate 130 work in coordination with the transport belts 320 and rubber grip plate 150 to achieve precise media positioning and stacking. Each stage represents a specific configuration of the sliding plates and demonstrates the progression from initial media item entry through final release of stacked media items, highlighting how the disclosed technology eliminates the need for continuous cycling while maintaining secure control throughout the stacking process.

Figure 3:
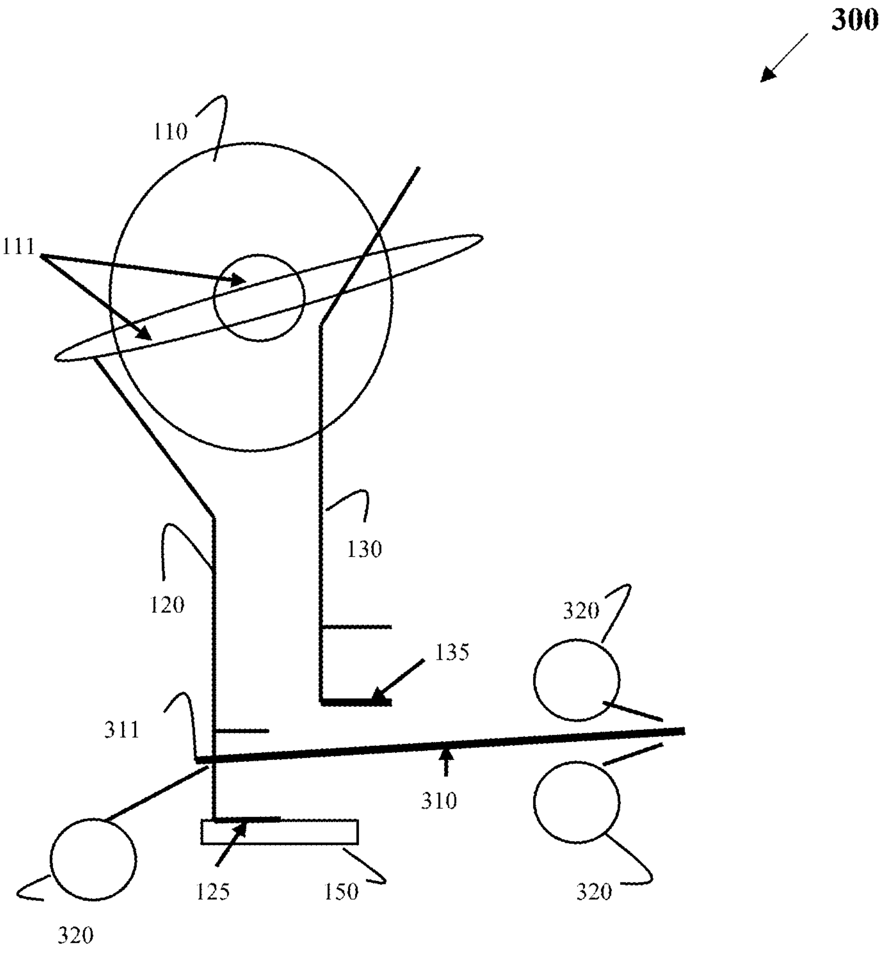
FIG. 3 is a diagram depicting a first stage of the stepper re-buncher apparatus upon entry of a first media item, according to an example embodiment.

FIG. 3 is a diagram depicting a first stage 300 of the stepper re-buncher apparatus 100 upon entry of a first media item 310, according to an example embodiment. In this initial stage, the first sliding plate 120 is positioned in the down position while the second sliding plate 130 is positioned in the up position. The first media item 310 enters the stepper re-buncher apparatus 100 along media path 140 with its trailing edge 311 positioned a few millimeters short of passing completely through window aperture 126. The transport belts 320 are stationary at this stage, maintaining the first media item 310 in the precise position as detected by track sensor 160. This positioning ensures optimal control for the subsequent stepping motion.

Figure 4:
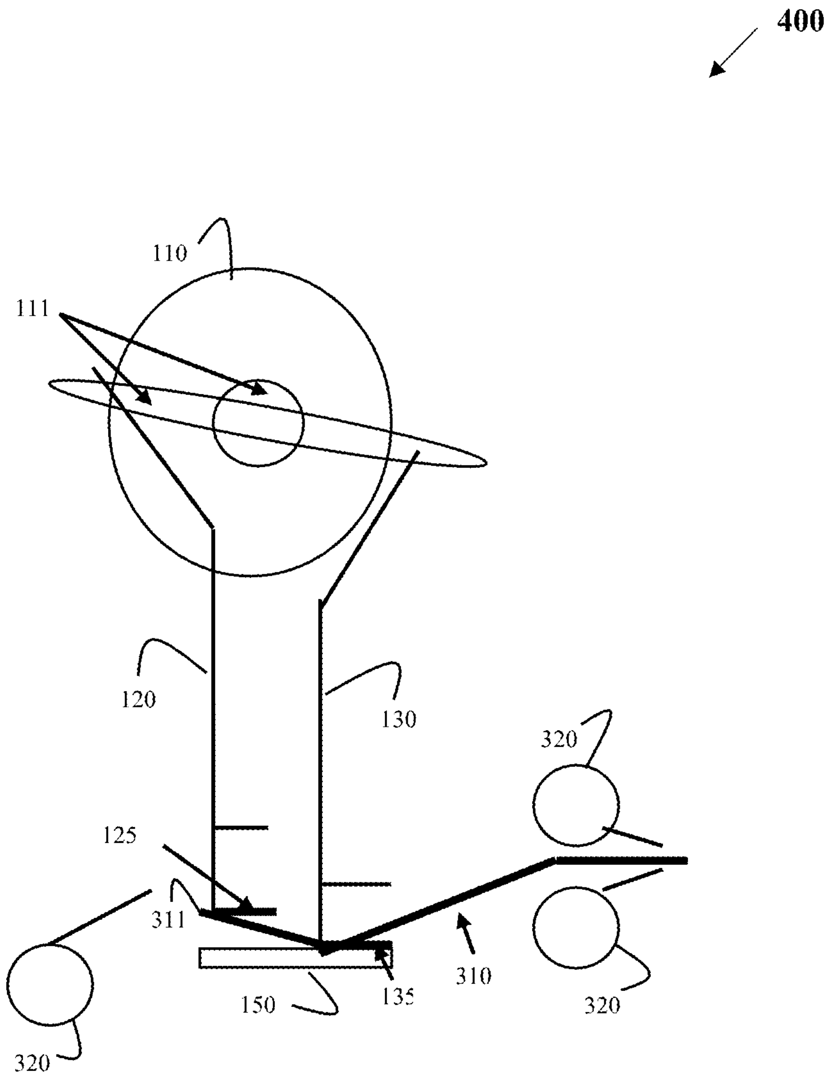
FIG. 4 is a diagram of a second stage of the stepper re-buncher apparatus as a first media item is stepped through the stepper re-buncher apparatus, according to an example embodiment.

FIG. 4 depicts the second stage 400 of the stepper re-buncher apparatus 100 as the first media item 310 is stepped through the apparatus, according to an example embodiment. The first sliding plate 120 has moved to the up position while the second sliding plate 130 has moved to the down position through the synchronized opposing movement controlled by drive mechanism 110 and pegs 111. This coordinated movement causes the trailing edge 311 of the first media item 310 to be released and flick out of window aperture 126. The first media item 310 is now gripped between the base 135 of the second sliding plate 130 and rubber grip plate 150, while transport belts 320 remain stationary to maintain precise control during the stepping process.

Figure 5:
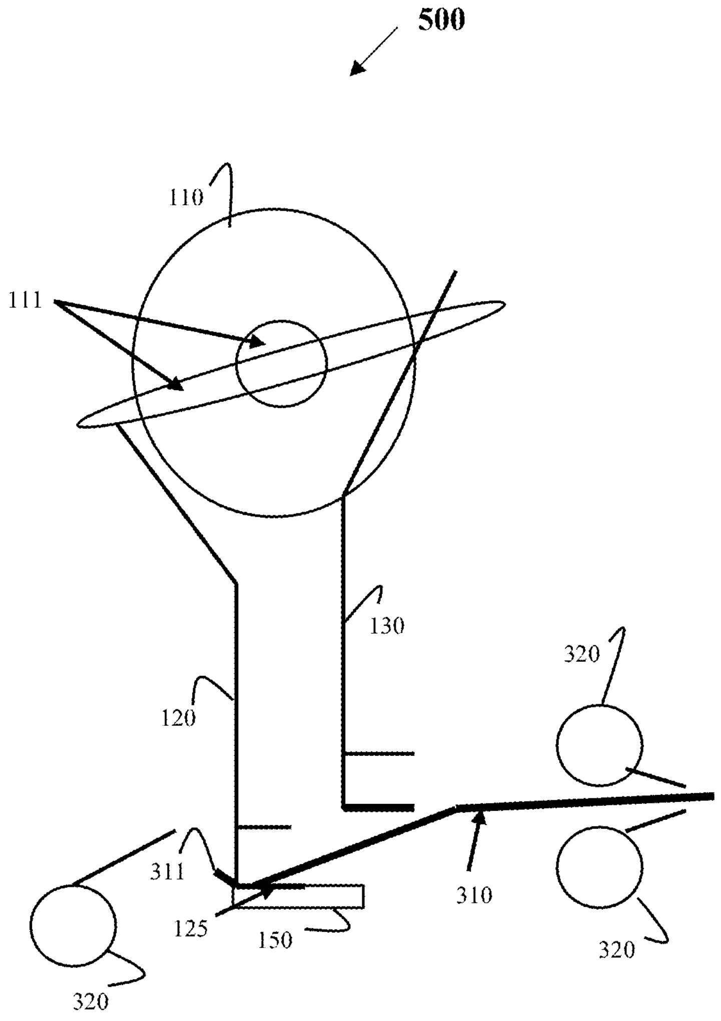
FIG. 5 is a diagram of a third stage of the stepper re-buncher with a trailing edge of the first media item clamped by a first sliding plate, according to an example embodiment.

FIG. 5 depicts the third stage 500 of the stepper re-buncher apparatus 100 with the trailing edge 311 of the first media item 310 clamped by the first sliding plate 120, according to an example embodiment. The sliding plates have reversed their positions, with the first sliding plate 120 returning to the down position and the second sliding plate 130 returning to the up position. The trailing edge 311 of the first media item 310 is now securely clamped between the base 125 of the first sliding plate 120 and rubber grip plate 150. The gripping teeth on base 125 exert approximately 0.043 $N/mm^2$ of pressure to maintain secure control of the first media item 310 in preparation for receiving additional media items.

Figure 6:
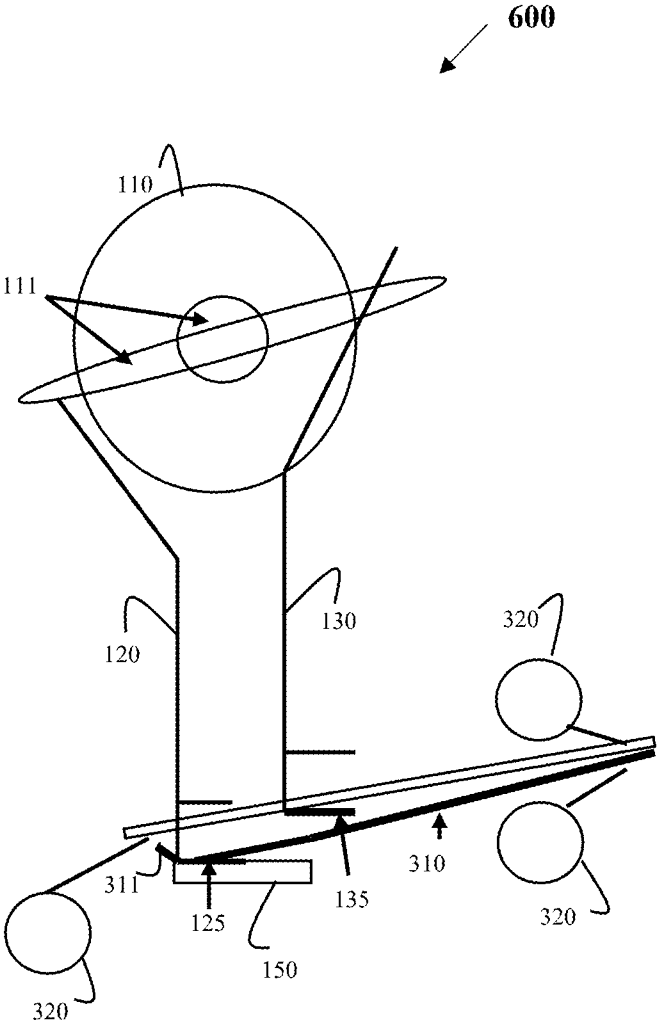
FIG. 6 is a diagram depicting a fourth stage of the stepper re-buncher upon entry of a second media item, according to an example embodiment.

FIG. 6 depicts the fourth stage 600 of the stepper re-buncher apparatus 100 upon entry of a second media item 710, according to an example embodiment. While the first media item 310 remains clamped in position by the first sliding plate 120 against rubber grip plate 150, a second media item 710 enters the apparatus along media path 140. The transport belts 320 are reactivated to pull the second media item 710 through the system until its trailing edge 711 reaches the same predetermined position as the first media item 310 achieved in the first stage. The gripping teeth on the first sliding plate 120 maintain sufficient pressure to secure the first media item 310 against the pulling force exerted by transport belts 320, demonstrating the calibrated balance between belt tension and clamping force.

Figure 7:
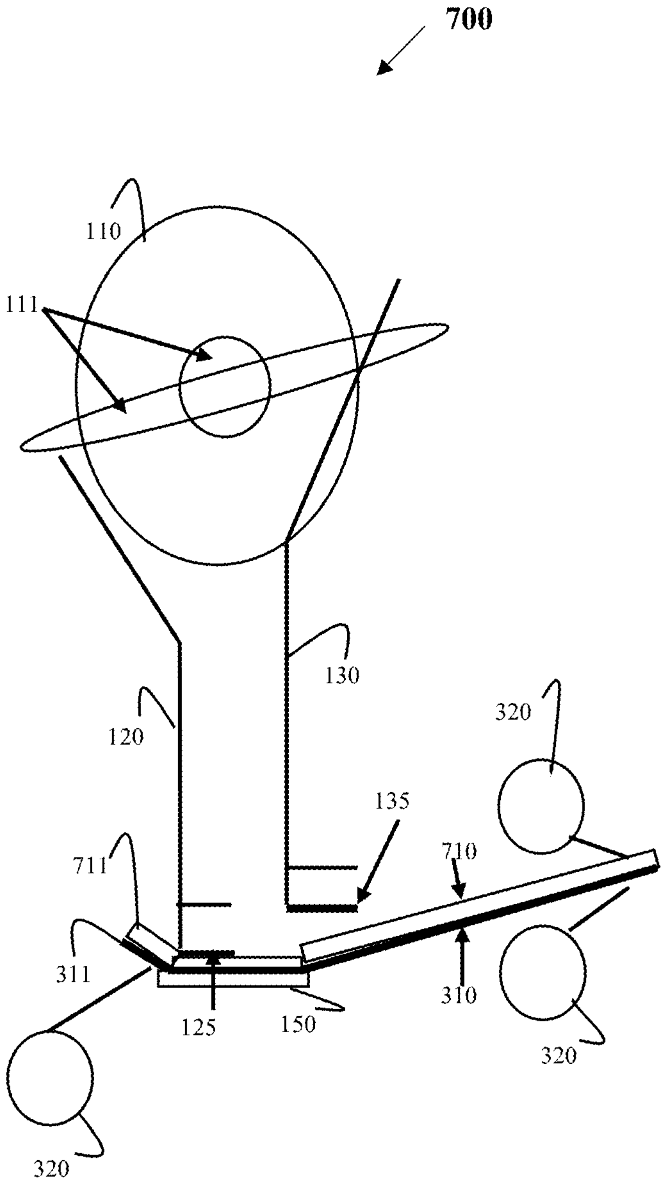
FIG. 7 is a diagram depicting a fifth stage of the stepper re-buncher with the second media item stacked atop the first media item, according to an example embodiment.

FIG. 7 depicts the fifth stage 700 of the stepper re-buncher apparatus 100 with the second media item 710 stacked atop the first media item 310, according to an example embodiment. The stepping motion sequence described in stages two and three is repeated for the second media item 710, resulting in both the first media item 310 and second media item 710 being secured together as a stack. The synchronized movement of the first sliding plate 120 and second sliding plate 130 through drive mechanism 110 and pegs 111 enables precise control over the stacking process. Both media items are now held securely between the base 125 of the first sliding plate 120 and rubber grip plate 150, with the stack remaining stationary rather than cycling through a circuit as required by conventional designs.

Figure 8:
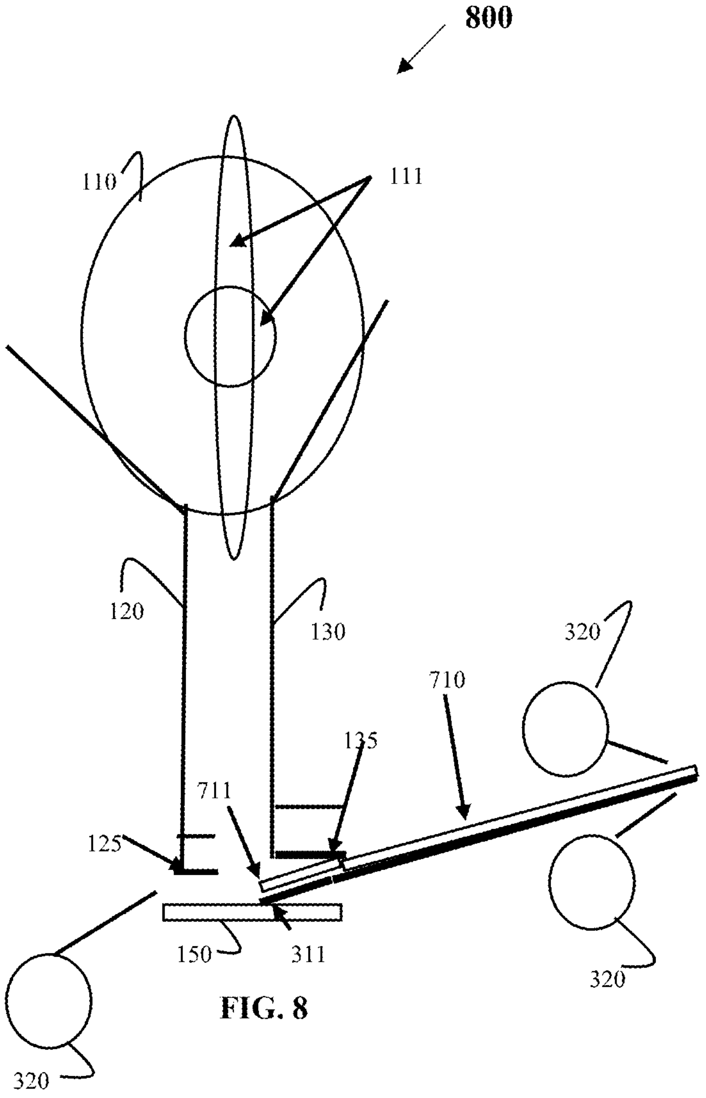
FIG. 8 is a diagram depicting a sixth stage of the stepper re-buncher as the stacked first and second media items are transported out of the stepper re-buncher, according to an example embodiment.

FIG. 8 depicts the sixth stage 800 of the stepper re-buncher apparatus 100 as the stacked first media item 310 and second media item 710 are transported out of the apparatus, according to an example embodiment. Both the first sliding plate 120 and second sliding plate 130 are positioned in their release positions, unclamping the stacked media items from rubber grip plate 150. The transport belts 320 are reactivated to transport the complete stack of media items away from the stepper re-buncher apparatus 100 along media path 140 toward the exit for subsequent processing or presentation to a customer. This release stage demonstrates how the apparatus can efficiently output stacked media items while maintaining the compact footprint that distinguishes the disclosed technology from conventional circular or oval re-buncher designs.

Figure 9:
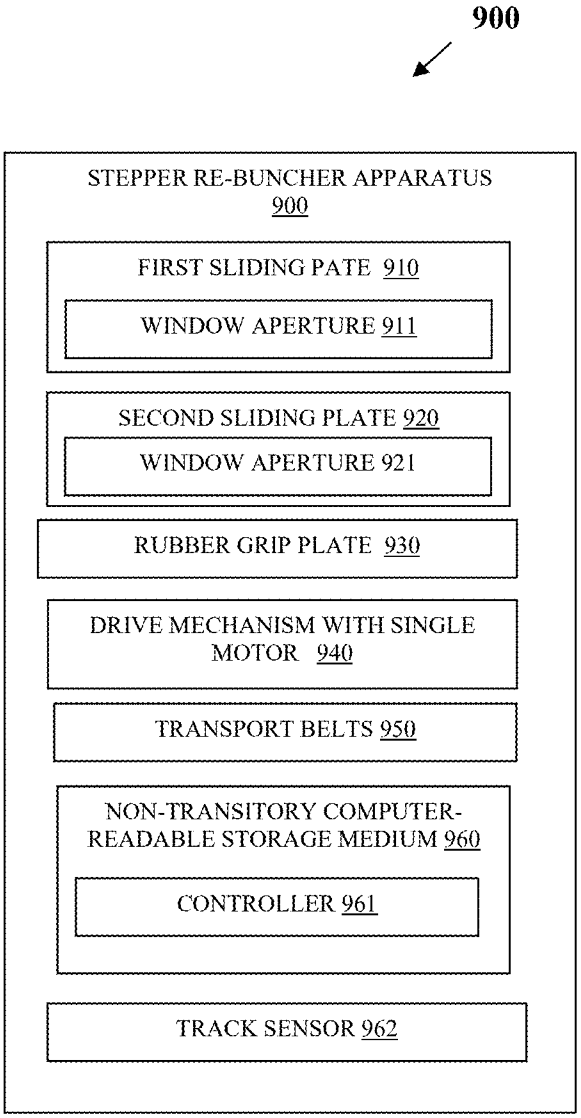
FIG. 9 depicts the stepper re-buncher apparatus, according to an example embodiment.

FIG. 9 depicts the stepper re-buncher apparatus 900, according to an example embodiment. The stepper re-buncher apparatus 900 includes the first sliding plate 910 with window aperture 911, second sliding plate 920 with window aperture 921, and rubber grip plate 930. The drive mechanism with single motor 940 provides the motive force for the synchronized stepping motion through the mechanical linkage system. Transport belts 950 are positioned to move media items through the apparatus along the defined media path. The apparatus further includes a non-transitory computer-readable storage medium 960, controller 961, and track sensor 962 that work together to provide precise control over the stepping sequence and media positioning. This integrated configuration demonstrates how the disclosed technology achieves the reduced footprint of approximately 9,715 $mm^2$ while maintaining the capability to stack up to ten media items.

Controller 961 represents software or firmware instructions that are executed by a processor. When the processor executes the instructions, the processor is caused to provide synchronized and precise control of the sliding plates stepping sequence, activation of transport belts 950, and positioning of media items being stacked within the stepper re-buncher apparatus 900.

The non-transitory computer-readable storage medium 960 stores the software instructions that enable controller 961 to coordinate the complex timing sequences required for proper operation of the stepper re-buncher apparatus 900. These instructions include algorithms for controlling the synchronized opposing motion of the sliding plates, managing the activation and deactivation of transport belts 950, and processing input from track sensor 962 to ensure precise media positioning throughout the stacking process.

The integration of hardware and software components within stepper re-buncher apparatus 900 enables the stepper re-buncher apparatus 900 to achieve the precise control necessary for reliable media stacking while maintaining the compact footprint that distinguishes the disclosed technology from conventional designs. The controller 961 coordinates all mechanical movements to ensure that media items are properly positioned, securely gripped, and accurately stacked without requiring the continuous cycling motion characteristic of traditional circular or oval re-buncher configurations.

The stepper re-buncher apparatus 900 is designed to handle media items with dimensions up to 225 mm in length, which is typical for checks and similar documents processed in transaction terminals. The apparatus maintains a media path width of approximately 110 mm to accommodate standard media processing requirements while achieving the compact footprint that distinguishes it from conventional designs.

Figure 10:
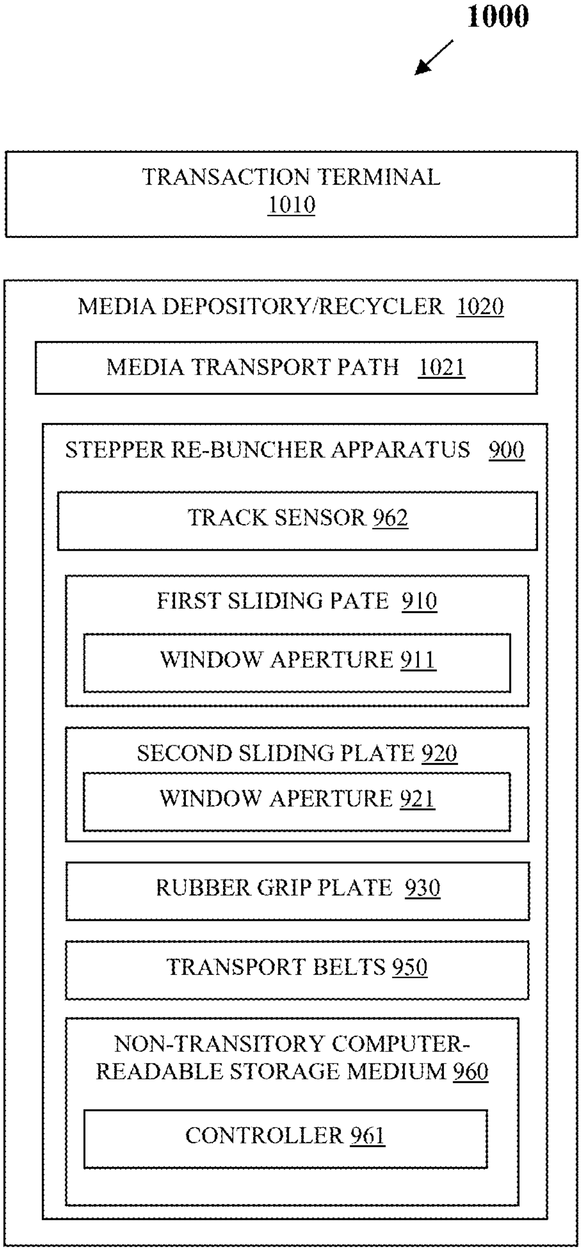
FIG. 10 is a diagram of a system that includes the stepper re-buncher apparatus, according to an example embodiment.

FIG. 10 depicts a system 1000 that includes the stepper re-buncher apparatus 900 integrated within a transaction terminal 1010, according to an example embodiment. The system includes a transaction terminal 1010 and a media depository/recycler 1020. Notably, the components are shown schematically in simplified form, with only those components relevant to understanding of the embodiments being illustrated.

The media depository/recycler 1020 includes a media transport path 1021 and a stepper re-buncher apparatus 900. Notably, the media depository/recycler 1020 includes a variety of other modules or components, such as an infeed module, a note/bill validation module, a deskew module, upper and lower transport paths, an escrow module, media cassettes, and others.

The media depository/recycler 1020 is an integrated peripheral device of transaction terminal 1010. The transaction terminal 1010 interacts with terminal operators to perform media-based transactions, such as media deposits, media withdrawals, or cash transactions for which checks or cash is provided as payment for the purchase of an item and media change is provided back to the customer, if applicable. The transaction terminal 1010 may include an automated teller machine (ATM), a self-service terminal (SST), a point-of-sale (POS) terminal, a teller terminal, or a self-checkout (SCO) terminal.

The media transport path 1021 defines the route through which media items travel within the media depository/recycler 1020, with the stepper re-buncher apparatus 900 strategically positioned along this path to enable efficient media stacking operations. The stepper re-buncher apparatus 900 includes all the components previously described: the first sliding plate 910 with window aperture 911, second sliding plate 920 with optional window aperture 921, rubber grip plate 930, transport belts 950, non-transitory computer-readable storage medium 960, controller 961, and track sensor 962.

Controller 961 monitors positions of media items entering the stepper re-buncher apparatus 900 through track sensor 962. Furthermore, controller 961 controls activation and deactivation of transport belts 950 and controls synchronized movement of first sliding plate 910 and second sliding plate 920 to ensure proper media item positioning during media item stacking within the stepper re-buncher apparatus 900.

The system 1000 configuration demonstrates how the compact design of the stepper re-buncher apparatus 900 enables positioning within standard size areas of straight transport within existing transaction terminal layouts, providing greater flexibility compared to conventional circular or oval re-buncher designs that require awkward angled placement. The reduced footprint of approximately 9,715 $mm^2$ allows the stepper re-buncher apparatus 900 to be integrated into the media transport path 1021 without requiring significant modifications to existing terminal architectures. The track sensor 962 communicates with controller 961 to coordinate precise timing of media item positioning as items travel along the media transport path 1021 toward the stepper re-buncher apparatus 900. The reduced footprint is achieved by creating linear motion in two stepping plates as opposed to conventional approaches that utilize circular motion when stacking media items; circular motion requires more space within a conventional re-buncher to stack media items than does stepper re-buncher apparatus 900.

The integration of the stepper re-buncher apparatus 900 within the media depository/recycler 1020 enables the transaction terminal 1010 to process media deposits more efficiently while utilizing less internal space compared to conventional re-buncher designs. The stepper re-buncher apparatus 900 can handle up to ten media items in a single stack, providing sufficient capacity for typical customer transactions while maintaining the compact footprint that allows for flexible positioning within the media transport path 1021.

The controller 961 interfaces with other components of the media depository/recycler 1020 to coordinate the overall media handling process. When media items are received through the infeed module and processed through validation and deskew modules, the controller 961 ensures that the stepper re-buncher apparatus 900 is ready to receive and stack the items according to the predetermined sequence. This coordination enables seamless integration of the stepper re-buncher apparatus 900 within the broader media processing workflow of the transaction terminal 1010.

The stepper re-buncher apparatus 900 represents a significant improvement over traditional re-buncher designs by eliminating the need for media items to travel around in a circuit for every stacking operation. Traditional circular or oval re-bunchers require circumferences greater than 225 mm to accommodate the longest media items, resulting in larger field replaceable units (FRUs) that are more difficult to position within device layouts. The disclosed technology's linear stepping approach provides a more suitable shape for integration within media handling devices.

Figure 11:
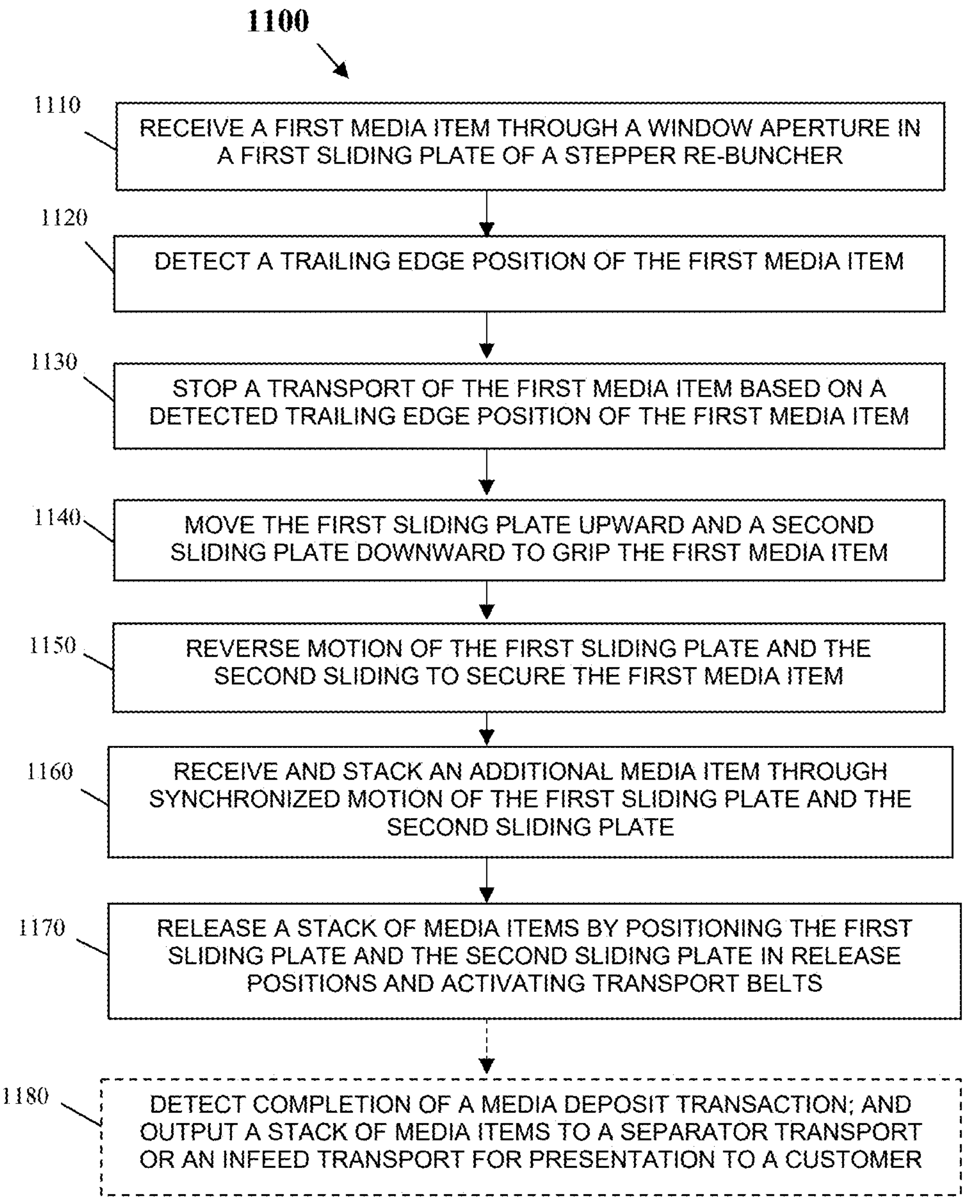
FIG. 11 is a flow diagram of a method for operating the stepper re-buncher apparatus, according to an example embodiment.

FIG. 11 is a flow diagram of a method 1100 for operating the stepper re-buncher apparatus, according to an example embodiment. The method 1100 is implemented as software or firmware instructions representing a controller. A processor executes the instruction to cause the processor to perform the operations associated with method 1100. In an embodiment, the processor is associated with a stepper re-buncher apparatus 900, a media depository/recycler 1020, and/or a transaction terminal 1010. In an embodiment, the controller is controller 961.

At 1110, the controller detects receiving of a first media item through a window aperture in a first sliding plate of a stepper re-buncher. At 1120, the controller detects a trailing edge position of the first media item.

At 1130, the controller causes a transport of the first media item to stop based on a detected trailing edge position of the first media item. At 1140, the controller causes movement of the first sliding plate upward and a second sliding plate downward to grip the first media item.

At 1150, the controller causes motion of the first sliding plate and the second sliding plate to reverse in order to secure the first media item. At 1160, the controller causes the stacking of an additional media item through synchronized motion of the first sliding plate and the second sliding plate.

At 1170, the controller causes the stack of media items to be released by causing positioning of the first sliding plate and the second sliding plate to move to release positions and causing activation of transport belts to move the stack of media items out of the stepper re-buncher for return to a customer during a media transaction at a terminal or for storage within a media depository/recycler of the terminal. In an embodiment, at 1180, the controller detects completion of a media deposit transaction and causes output of the stack of media items to a separator transport or an infeed transport for presentation to the customer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. An apparatus comprising:
- a first sliding plate having a window aperture;
- a second sliding plate;
- a rubber grip plate;
- a motor coupled to both the first sliding plate and the second sliding plate;
- a drive mechanism converting rotational motion of the motor to synchronized linear motion of the first sliding plate and the second sliding plate;
- transport belts configured to move media items through the window aperture; and
- a controller configured to:
  - control the motor to move the first sliding plate and the second sliding plate in opposing directions to grip media items between at least one of the first sliding plate, the second sliding plate, and the rubber grip plate, and
  - control the transport belts to move media items through the window aperture.

2. The apparatus of claim 1, wherein the first sliding plate includes gripping teeth configured to exert pressure on media items against the rubber grip plate.

3. The apparatus of claim 2, wherein the gripping teeth exert approximately 0.043 $N/mm^2$ of pressure.

4. The apparatus of claim 1, wherein the drive mechanism comprises a planetary gearbox and gear train providing low speed and high torque output.

5. The apparatus of claim 1, further comprising a track sensor positioned before the window aperture to detect media item position.

6. The apparatus of claim 5, wherein the controller is further configured to stop transport belt movement when the track sensor detects a trailing edge of a media item is positioned a predetermined distance from passing through the window aperture.

7. The apparatus of claim 1, wherein the transport belts are configured to provide sufficient grip force to transport between one and ten stacked media items.

8. The apparatus of claim 1, wherein the synchronized linear motion comprises the first sliding plate and the second sliding plate moving in opposite vertical directions.

9. The apparatus of claim 1, wherein the apparatus has a footprint area of approximately 9,715 square millimeters.

10. The apparatus of claim 1, wherein the first sliding plate and the second sliding plate are configured to stack up to ten media items.

11. The apparatus of claim 1, wherein the controller is further configured to release stacked media items by positioning both sliding plates in release positions and activating the transport belts.

12. A system, comprising:
- a transaction terminal having a media depository;
- a media transport path within the media depository; and
- a stepper re-buncher positioned along the media transport path, the stepper re-buncher comprising:
  - a first sliding plate and a second sliding plate driven by a single motor in synchronized opposing motion;
  - a window aperture in the first sliding plate;
  - a rubber grip plate;
  - transport belts configured to move media items through the window aperture; and
  - a controller configured to coordinate motion of the first sliding plate, the second sliding plate, and transport belts to stack multiple media items.

13. The system of claim 12, wherein the stepper re-buncher is positioned within a standard size area of straight transport within the media depository.

14. The system of claim 12, wherein the media depository comprises an automated teller machine (ATM) check processing module.

15. The system of claim 12, further comprising a track sensor interfaced with the controller to detect media item positions along the media transport path.

16. The system of claim 12, wherein the stepper re-buncher comprises a drive mechanism converting rotational motion to linear motion through a crank mechanism.

17. The system of claim 12, wherein the controller is configured to operate the stepper re-buncher to maintain stacked media items stationary while receiving additional media items.

18. The system of claim 12, wherein the stepper re-buncher is configured to output stacked media items to a separator transport or an infeed transport of the media depository.

19. A method, comprising:

receiving a first media item through a window aperture in a first sliding plate of a stepper re-buncher;

detecting a trailing edge position of the first media item;

stopping transport of the first media item based on a detected trailing edge position;

moving the first sliding plate upward and a second sliding plate downward to grip the first media item;

reversing motion of the first sliding plate and the second sliding plate to secure the first media item;

receiving and stacking an additional media item through synchronized motion of the first sliding plate and the second sliding plate; and releasing a stack of media items by positioning the first sliding plate and the second sliding plate in release positions and activating transport belts.

20. The method of claim 19, further comprising:

detecting completion of a media deposit transaction; and outputting the stack of media items to a separator transport or an infeed transport for presentation to a customer.

* * * * *